United States Patent
Reimert

(10) Patent No.: US 6,730,272 B2
(45) Date of Patent: *May 4, 2004

(54) IN-LINE GAS PRE-HEATING

(75) Inventor: Rainer Reimert, Karlsruhe (DE)

(73) Assignee: EWE Aktiengesellschaft, Oldenburg (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/242,473
(22) PCT Filed: Jul. 26, 1997
(86) PCT No.: PCT/EP97/04074
§ 371 (c)(1), (2), (4) Date: Nov. 30, 1999
(87) PCT Pub. No.: WO98/07970
PCT Pub. Date: Feb. 26, 1998

(65) Prior Publication Data
US 2002/0187088 A1 Dec. 12, 2002

(30) Foreign Application Priority Data
Aug. 21, 1996 (DE) .......................... 196 33 674

(51) Int. Cl.$^7$ .............................. F17D 1/00; F17D 1/05; F16L 53/00
(52) U.S. Cl. ................ 422/110; 422/105; 422/107; 48/190; 48/191; 48/127.3; 137/14; 432/29; 432/178
(58) Field of Search ............... 48/191, 127.3, 48/190; 422/204, 107, 110, 112, 105; 60/648, 722, 723; 431/232, 233, 263, 349; 432/14, 29, 136, 178, 179, 222; 137/13, 14, 551, 557; F16D 1/00, 1/05; F16L 53/00

(56) References Cited

U.S. PATENT DOCUMENTS

| | | | | |
|---|---|---|---|---|
| 3,589,025 A | * | 6/1971 | Hamerski | ..................... 34/468 |
| 3,898,040 A | * | 8/1975 | Tabak | ......................... 422/171 |
| 4,033,730 A | | 7/1977 | Baron | |
| 4,161,393 A | | 7/1979 | Rudolph | |
| 4,299,192 A | * | 11/1981 | Enga | ......................... 122/4 D |
| 4,426,810 A | | 1/1984 | Rudolph | |
| 4,445,910 A | * | 5/1984 | Zimmerman | ................... 48/76 |
| 4,599,092 A | | 7/1986 | Eichelsbacher | |
| 4,728,250 A | | 3/1988 | Wilhelm | |
| 4,741,807 A | | 5/1988 | Wilhelm | |
| 4,749,122 A | * | 6/1988 | Shriver et al. | ................. 236/14 |
| 4,753,565 A | | 6/1988 | Reimert | |
| 4,871,308 A | | 10/1989 | Norton | |
| 4,931,013 A | * | 6/1990 | Brahmbhatt et al. | ........... 431/10 |
| 5,026,937 A | * | 6/1991 | Bricker | ....................... 585/415 |
| 5,120,445 A | * | 6/1992 | Colman | ...................... 210/640 |
| 5,159,886 A | | 11/1992 | Schaub | |
| 5,215,042 A | | 6/1993 | Beisswenger | |
| 5,437,123 A | * | 8/1995 | Greiner et al. | ................ 48/107 |
| 5,503,660 A | | 4/1996 | Reimert | |
| 5,628,191 A | | 5/1997 | Kueck | |
| 5,635,147 A | | 6/1997 | Herbert | |

FOREIGN PATENT DOCUMENTS

| | | |
|---|---|---|
| EP | 453 007 A2 | 3/1991 |
| EP | 566285 | 1/1993 |
| EP | 635 673 A1 | 7/1994 |
| NL | 8700630 | 3/1987 |

* cited by examiner

Primary Examiner—Jerry D. Johnson
Assistant Examiner—Alexa A. Doroshenk
(74) Attorney, Agent, or Firm—Pillsbury Winthrop LLP

(57) ABSTRACT

A process for heating fuel gas under high pressure before it is expanded. The gas is directly heated by burning part of the gas in the gas pipeline.

11 Claims, 1 Drawing Sheet

IN-LINE GAS PRE-HEATING

This application is the national phase of international application PCT/EP97/04074 filed Jul. 26, 1997 which designated the U.S.

The invention relates to a method and an apparatus for conditioning gas before and after the high pressure is relieved.

BACKGROUND ART

Many combustible gases are either naturally at high pressure, or are brought to it through technology. Natural gas pumped from underground deposits, for instance, is at a high pressure, as are gases in underground gas reservoirs or large pressure vessels. Gases that are relieved from high pressure to a lower pressure, for instance during pumping, removal from reservoir storage, or in a gas turbine, cool down severely as a consequence of the expansion. This presents several technical problems, because inflow lines for instance can ice up, or the physical properties of the gases change, or the readiness to ignite is diminished. To overcome these technical disadvantages and to compensate for the cooling down, the gas is heated before or after the pressure relief. Typically, however, this heating is done before the pressure relief, or in other words while the gas is at high pressure.

As conventional, typical preheater units, especially for underground natural gas reservoir systems, two different systems are primarily employed: Gas preheating systems, and gas heaters. Typically, both types of system include three components: heat generation, heat exchangers, and the heat carrier system. They differ only in their embodiment or in their three-dimensional arrangement. In the gas preheating system, the gas which is at reservoir pressure is passed through a heat exchanger. There the reservoir gas is heated, and the corresponding carrier medium, such as a mixture of water and glycol, is cooled down in countercurrent in parallel pipelines. The heat carrier medium is then reheated in a closed loop and returned to the heat exchanger. Regulating the gas temperature is usually accomplished via the flow rate of the heat carrier through the heat exchanger; the quantity of heat carrier medium depends on the reduction in the gas temperature after the pressure relief. However, it is also possible to control the gas temperature by regulating the flow rate of the reservoir gas. Beyond the heat generation, heat exchanger and heat carrier system components, the expense in terms of equipment for the preheating system extends to a boiler housing for the heat exchanger and to the safety and control system for both the boiler unit and the heat carrier system. The delivery of heat can be done by combusting liquid or gaseous fuels, through electrical energy, or by using gas heating pumps.

Gas heaters are preheating devices in which both heat generation and the heat transfer to the reservoir gas flowing through are done in a single step. The heaters are horizontal containers that are equipped with flame pipes in their lower portion and pipe banks in their upper portion; the interstices are filled with heat carrier medium. The reservoir gas and the natural gas needed for heating the water bath pass through the gas heater in opposite directions, and the heat carrier medium is heated by the flame pipes. The regulation of the gas temperature is done here directly at the heat exchanger, by adjusting the fuel flow to suit the amount of heat required. In contrast to preheating systems, natural gas heaters are set up entirely out in the open, and the expense for equipment extends not only to the components already named above but beyond that to safety and control devices for both the fuel gas and the reservoir gas.

In a departure from the basic concepts presented above, it has been proposed in International Patent Disclosure WO 94/11626 of Kück et al. that the gas be heated in a heat exchanger, as in the above two systems, before the expansion. Here, though, the heating is to be done with the aid of the exhaust gas from small block heating and power station, and an internal gas combustion engine and a generator are used. The exhaust gas from the combustion engine heats up the reservoir gas in a heat exchanger before the expansion. Through the block heating and power station, driving the generator generates electrical energy, which can be fed into the power grid.

European Patent EP 0 453 007 to Verweij is an original variant of the above systems. It too uses an internal combustion engine, usually a gas engine, and along with exhaust gases the waste heat from the engine and the air needed for combustion are also utilized to heat the gas. The gas is cooled down in a countercurrent in a heat exchanger before being used in the engine. Correspondingly more heat exchangers are used, and it is proposed that one heat exchanger be used upstream and the other downstream of the expansion of the reservoir gas. Once again, the combustion engine drives a generator, which generates electrical energy.

U.S. Pat. No. 4,871,308 to Norton et al. pertains to a system for heating a flow of liquid. In it, separate gas flows of natural gas and air are fed in a controlled, compressed manner into an injection and mixing zone, with one gas being expanded and the other being compressed, and are then carried into a combustion system, and the exhaust gases are used via a heat exchanger to heat a liquid. This system can also be used to heat reservoir gases.

It is a common feature of all the methods described above that they heat the gas flow of the reservoir gas only indirectly, through heat exchangers or carrier mediums. In principle, the gas is first heated before the pressure relief occurs, or in other words while still at high pressure in the heat exchanger. The proposed apparatuses with combustion systems disadvantageously require official permits and demand a large amount of safety technology. The energy is obtained either from the combustible gas or from a gas boiler fired with natural gas. The most pronounced disadvantage of the systems described, however, is an ecological deficit, since none of the systems described can utilize 100% of the combustion heat of the calorific value consumed in the prior art. The efficiency of the systems used until now is correspondingly low; that is, the energy consumption necessary to achieve the desired effect is correspondingly high.

There has accordingly been a need for an apparatus or a method which dispenses with a combustion system for which an official permit must be obtained, and which for environmental reasons achieves high utilization of the combustion heat of the energy consumed. The system should also meed the needs for an ecologically appropriate and economical energy supply.

SUMMARY OF THE INVENTION

According to the invention, it is now proposed that an apparatus in accordance with the main claim be used.

It has surprisingly been demonstrated, in a series of texts, that it is possible for the gas flow of a combustible gas that is at high pressure to be combusted in a controlled way in a closed container, and thus for the gas to be heated continuously.

Combustible gas escapes from a reservoir at high pressure. It flows through a pipeline up to a point where oxygen is added, in either pure or dilute form. This addition can be done via a gas distributor, which communicates with an ignition device and a flame monitor, or via a burner. There, controlled combustion takes place, and the quantity of oxygen or oxygen-containing gas that has to be added is controlled via a temperature measurement. When the gas is heated by direct combustion in the pipeline, water is produced, among other components; this water may be in liquid form and is caught in a trap before the pressure relief of the gas. The heated gas, saturated with water vapor, is then relieved to a different, lower pressure in some suitable apparatus or device, such as a throttle valve or a gas turbine. This is followed by the temperature sensor and usually a further trap, to which—as is usual in the prior art—a drying system, for instance in the form of a glycol scrubber, is connected.

In the present invention, it has proved advantageous in some cases to perform the combustion with pure oxygen or an arbitrary mixture of oxygen and air, instead of with pure air. To avoid overly high temperatures, the combustion can also be promoted by the use of a suitable catalyst.

BRIEF DESCRIPTION OF THE DRAWINGS

The method will now be described in conjunction with the drawings, in which.

DETAILED DESCRIPTION

Figure 1:
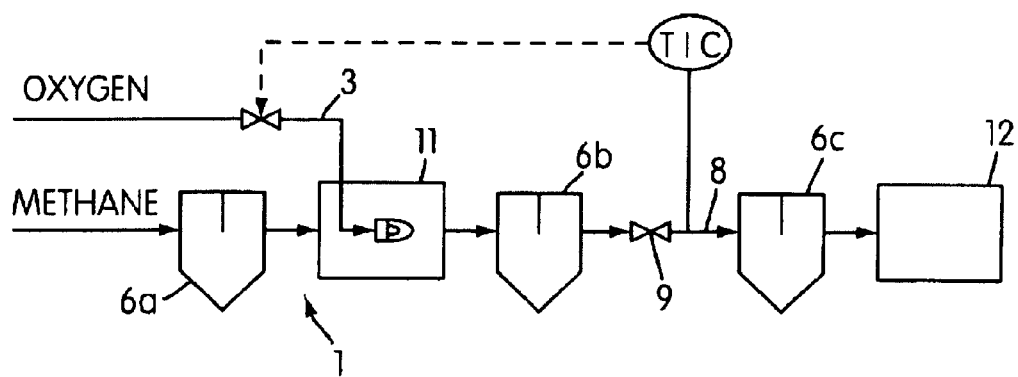
FIG. 1 is a simplified flow chart of a method according to the present invention.

Combustible gas, captioned in FIG. 1 as methane, is drawn from a reservoir, for instance, at a pressure of 180 bar. Any solid or liquid accompanying substances are separated out in the first trap (6a). Depending on the reservoir conditions, the gas is usually at a temperature between 10 and 30° C. In this state, the gas reaches the oxygen introduction pipeline (3). The addition is effected either via a gas distributor, which is connected to an ignition device and a flame monitor, and optionally to an oxidation catalyst, or via a burner, in which the flow courses of the natural gas and oxygen-containing gas are transposed compared with conventional burners. The quantity of added oxygen is controlled via temperature measurement (8). The temperature measuring sensor (8) is located in the pipeline (1) downstream of the point at which the pressure relief (9) occurs, either upstream or downstream of the third water trap (6c). In the course of the heating of the gas by direct combustion in the pipeline, water, among other components, is produced which can be, in part, in liquid form and is trapped in a second trap (6b) before the gas is relieved of pressure. The now-heated gas, saturated with water vapor, is relieved in some suitable apparatus, such as a gas turbine, for example from 180° C. to a different, lower pressure. The pressure relief is followed, in arbitrary order, by a temperature measuring sensor (8) and a third water trap (6c), which is generally followed by a drying system (12).

The method will now be described in conjunction with the simplified flow chart in FIG. 1:

Combustible gas, here captioned as methane, is drawn from a reservoir at a pressure of 180 bar, for instance. Any solid or liquid accompanying substances are separated out in the trap (6a). Depending on the reservoir conditions, the gas is usually at a temperature between 10 and 30° C. In this state, the gas reaches the point in the pipeline at which oxygen in pure or dilute form (3) is added (11). The addition is effected either via a gas distributor, which is connected to a ignition device and a flame monitor, and optionally to an oxidation catalyst, or via a burner, in which the flow courses of the natural gas and oxygen-containing gas are transposed compared with conventional burners. The quantity of oxygen that has to be added is controlled via a temperature measurement (8). The temperature measurement (8) is located in the pipeline (1) downstream of the point at which the pressure relief (9) occurs, either upstream of downstream of the third water trap (6c). In the course of the heating of the gas by direct combustion in the pipeline, water, among other components, is produced which can in part be in liquid form and is trapped in a trap (6b) before the gas is relieved of pressure. The now-heated gas, saturated with water vapor, is relieved in some suitable apparatus, such as a gas turbine, for example from 180° C. to a different, lower pressure. The pressure relief is followed, in arbitrary order, by a temperature measuring sensor (3) and a further trap (6c), which is generally followed by a drying system (12).

The method will be described in further detail using the following numerical example, and assuming that the combustible gas is natural gas:

A natural gas to be dispensed from an underground reservoir is intended to be heated, before the pressure relief, enough that the temperature of the natural gas after the pressure relief to 40 bar, is 5° C.

| | Initial Data | |
|---|---|---|
| | Composition | Methane, water-saturated |
| Dispensed gas | Pressure: | 180 bar |
| | Temperature: | 20° C. |
| | Flow rate ($CH_4$) | 100,000 m³/h (i.N.) |
| Oxidant: | Pressure: | 180 bar |
| | Temperature: | 20° C. |

Thermodynamic analysis now shows that the natural gas, before the pressure relief, must be heated from 20° C. to 46° C. This requires that per kilogram (kg) of natural gas, 0.0067 kg of oxygen must be added, which then reacts with the natural gas to form $H_2O$ and $CO_2$. Under other conditions, correspondingly different temperatures would have to be attained, and different specific quantities of oxygen would have to be added.

Figure 2:
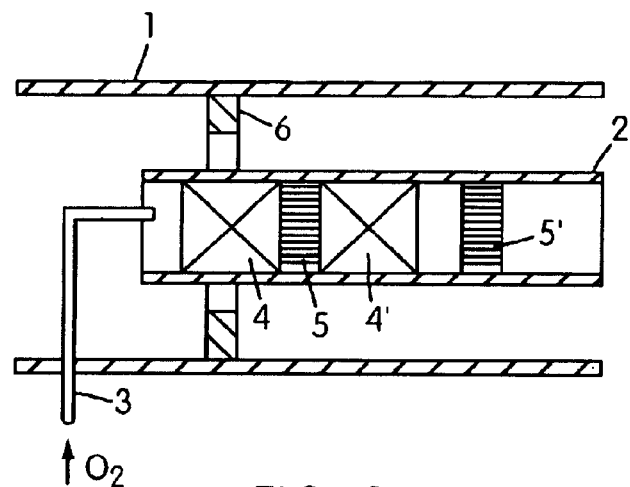
FIG. 2 shows an embodiment with catalytically guided combustion.

In the embodiment of FIG. 2, some of the gas, usually natural gas, that flows in the pipeline (1) is passed through a central tube (2). At the beginning of the central tube (2), oxygen is added via an oxygen introduction pipeline (3). In a mixing segment (4), oxygen and gas are mixed with one another. To that end, the mixing segment (4) can include built-in fixtures that promote the mixing process. The combustion of the gas takes place at the catalyst (5). It can be expedient to design the part (5) having the catalyst in such a way that not all the gas is combusted there, or that the gas in not combusted completely. In that case, a further mixing segment and a further catalyst should follow it. This is indicated in FIG. 2 by the elements 4', 5'). To assure that the gas will flow in sufficient amounts through the central tube (2), which presents increased resistance to its flow by way of the fixtures (4, 5), a flow baffle (6) is built into the open cross section of the pipeline (1), in the region where the central tube (2) is located; in the simplest case, this baffle is a sheet-metal ring.

Figure 3:
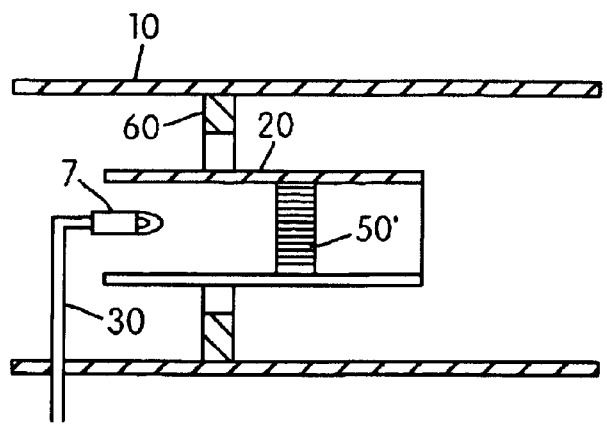
FIG. 3 shows an embodiment in which the combustion of the gas takes place in a burner.

In the embodiment of FIG. 3, the combustion of the natural gas takes place in a burner (7). The burner (7) is inserted in a central tube (20), which is located in the tube (10) that transports the gas, usually natural gas. The burner (7) can be embodied as purely a diffusion burner, or as a premixing burner. In the latter case, it is provided with devices, not shown here but known for instance from the Bunsen burner, that allow premixing of the gas and oxygen. Ignition and monitoring devices, of the kind that are usual in burner operation, are also not shown here. The oxygen is delivered via a line (30). To correct any possible incompleteness of combustion, it may be expedient also to dispose a combustion catalyst (50') in the central tube (20). The flow baffle (60) serves to cause the gas to flow through the central tube (20) in a sufficient amount.

What is claimed is:

1. A method of preheating combustible gas, comprising:
    providing a combustible gas flowing under a substantial pressure in a first pipeline;
    adding a controlled amount of oxygen to the first pipeline sufficient to combust some of the combustible gas;
    heating the combustible gas by subsequently combusting said some of the combustible gas directly in the first pipeline;
    relieving the substantial pressure;
    measuring the temperature of the heated combustible gas after pressure relief; and
    controlling said controlled amount of oxygen in accordance with the temperature measurements to attain a desired temperature of the combustible gas.

2. The method of claim 1, wherein the combustion is accomplished using an oxygen-containing gas.

3. The method of claim 2, wherein the oxygen-containing gas used is pure oxygen.

4. The method of claim 1, wherein oxygen or oxygen-containing gas is introduced via a second pipeline into the first pipeline carrying the combustible gas; and
    wherein the oxygen-containing gas is mixed and combusted with the combustible gas.

5. The method of claim 1, wherein the combustible gas that is at substantial pressure is natural gas.

6. The method of claim 1, further comprising:
    drying the gas by carrying away water produced in the combustion; and
    providing water traps both upstream and downstream of a pressure relief to trap the water.

7. The method of claim 1, wherein a gas distributor communicating with an ignition device is provided for said combusting.

8. The method of claim 7, wherein a catalyst is provided for the combustion.

9. The method of claim 1, wherein a burner is provided for combusting said combustible gas mixed with oxygen or oxygen containing gas.

10. The method of claim 1, wherein a flow baffle is mounted in the first pipeline.

11. A method of preheating combustible gas, comprising:
    providing a combustible gas flowing under a substantial pressure in a pipeline;
    adding a controlled amount of oxygen to the pipeline sufficient to combust some of the combustible gas;
    heating the combustible gas by subsequently combusting said some of the combustible gas directly in the pipeline;
    relieving the substantial pressure;
    measuring the temperature of the heated combustible gas after pressure relief; and
    controlling said controlled amount of oxygen in accordance with the temperature measurements to attain a desired temperature of the combustible gas,
    wherein a catalyst is provided for the combustion.

* * * * *